US009869226B2

(12) United States Patent
Broderick et al.

(10) Patent No.: US 9,869,226 B2
(45) Date of Patent: Jan. 16, 2018

(54) SYSTEM AND METHOD FOR SEQUENTIAL INJECTION OF REAGENT TO REDUCE NOX FROM COMBUSTION SOURCES

(71) Applicant: PEERLESS MFG. CO., Dallas, TX (US)

(72) Inventors: Jeffrey Michael Broderick, Ridgefield, CT (US); Scott H. Lindemann, Oxford, CT (US); Eric Lindemann, Oxford, CT (US); James M. Valentine, Fairfield, CT (US)

(73) Assignee: PEERLESS MFG. CO., Dallas, TX (US)

(*) Notice: Subject to any disclaimer, the term of this patent is extended or adjusted under 35 U.S.C. 154(b) by 699 days.

(21) Appl. No.: 14/292,302

(22) Filed: May 30, 2014

(65) Prior Publication Data

US 2014/0360168 A1 Dec. 11, 2014

Related U.S. Application Data

(60) Provisional application No. 61/832,556, filed on Jun. 7, 2013.

(51) Int. Cl.
*F01N 3/20* (2006.01)
*B01D 53/56* (2006.01)
*B01D 53/86* (2006.01)
*B01D 53/94* (2006.01)

(52) U.S. Cl.
CPC .......... *F01N 3/208* (2013.01); *F01N 2610/02* (2013.01); *F01N 2900/1404* (2013.01); *F01N 2900/1411* (2013.01); *F01N 2900/1812* (2013.01); *Y02T 10/24* (2013.01)

(58) Field of Classification Search
CPC ................ F01N 3/208; F01N 2610/02; F01N 2900/1411; F01N 2900/1812; F01N 2900/1404; F01N 3/20; F01N 2900/1821; Y02T 10/24; B01D 53/56; B01D 53/8631; B01D 53/9418
See application file for complete search history.

(56) References Cited

U.S. PATENT DOCUMENTS

| | | | |
|---|---|---|---|
| 3,900,554 A | 8/1975 | Lyon | |
| 4,777,024 A * | 10/1988 | Epperly | B01D 53/34 423/235 |
| 4,842,834 A | 6/1989 | Burton | |
| 5,199,255 A * | 4/1993 | Sun | B01D 53/56 60/772 |
| 5,342,592 A | 8/1994 | Peter-Hoblyn et al. | |

(Continued)

FOREIGN PATENT DOCUMENTS

| | | | | |
|---|---|---|---|---|
| CN | 105386825 A * | 3/2016 | ............. | F01N 3/208 |
| WO | WO 2014085075 A1 * | 6/2014 | ......... | F01N 13/0097 |

*Primary Examiner* — Timothy C Vanoy
(74) *Attorney, Agent, or Firm* — Andrews Kurth Kenyon LLP; Sean S. Wooden (57) ABSTRACT

In a large exhaust duct from a lean burn combustion source, such as a boiler, diesel engine or gas turbine, multiple injectors can be used to inject a reagent, such as an aqueous solution of urea or ammonia, into the exhaust for use in the catalytic reduction of NOx in a process known in the art as selective catalytic reduction (SCR). When operating at low injection rates, such as during low combustor loads, the injectors are operated individually for short periods of time in a sequential manner.

24 Claims, 3 Drawing Sheets

(56) References Cited

U.S. PATENT DOCUMENTS

| | | | | |
|---|---|---|---|---|
| 5,478,542 | A | * | 12/1995 | Chawla ................. B01D 53/56 423/235 |
| 5,489,420 | A | * | 2/1996 | Diep ..................... B01D 53/56 423/235 |
| 5,536,482 | A | * | 7/1996 | Diep ..................... B01D 53/56 423/235 |
| 5,676,071 | A | * | 10/1997 | Horler ................... B01D 53/30 110/190 |
| 5,976,475 | A | | 11/1999 | Peter-Hoblyn et al. |
| 7,467,749 | B2 | | 12/2008 | Tarabulski et al. |
| 7,824,636 | B1 | * | 11/2010 | Kraemer ............... B01D 53/30 422/108 |
| 8,109,077 | B2 | | 2/2012 | Reba et al. |
| 2003/0109047 | A1 | | 6/2003 | Valentine |
| 2012/0177553 | A1 | | 7/2012 | Lindemann et al. |
| 2012/0269705 | A1 | * | 10/2012 | Jensen .................. B01D 53/90 423/212 |
| 2014/0099247 | A1 | | 4/2014 | Jangiti |
| 2014/0150411 | A1 | * | 6/2014 | Golin .................. F01N 13/0097 60/286 |
| 2015/0093315 | A1 | * | 4/2015 | Broderick ............... F01N 3/208 423/239.1 |
| 2015/0345785 | A1 | * | 12/2015 | Valentine ............... F23J 15/003 110/215 |

* cited by examiner

SYSTEM AND METHOD FOR SEQUENTIAL INJECTION OF REAGENT TO REDUCE NOX FROM COMBUSTION SOURCES

FIELD OF THE INVENTION

The present invention relates generally to a method for reducing nitrogen oxide ("NOx") emissions from a lean burn combustor equipped with a NOx reducing exhaust catalyst, and more specifically to a such a method involving the operation of a plurality of reagent injectors in an off/on sequential manner to supply low flow rates of reagent corresponding to low loads or low NOx reduction requirements for the combustor.

BACKGROUND OF THE INVENTION

The art for the reduction of NOx from lean burn combustion sources has found the injection of ammonia or urea into exhaust ducts and flues upstream of a selective catalytic reduction (SCR) catalyst to be a solution to the issue of NOx emissions from diesel engines, gas turbines, boilers and the like. Urea, while a preferred reagent for SCR due to its safety and handling characteristics compared to ammonia, generally requires complicated and costly urea decomposition schemes directed at converting the aqueous urea reagent into ammonia gas prior to injection of ammonia gas into the exhaust through a series of ammonia distribution pipes or an ammonia injection grid (AIG). The AIG is located upstream of the SCR catalyst and positioned horizontally or vertically across the inside of an exhaust gas duct.

The direct injection of aqueous urea through a grid has generally not been practicable due to the formation of deposits in the grid from the incomplete decomposition of urea in the grid. This has led to efforts to inject urea at the wall of the duct, which while successful on small SCR applications, such as passenger car diesel exhausts and even larger stationary engines, has not generally been applied to the larger duct sizes and gas flows found on industrial boilers, furnaces and combustion turbines. That is generally due to: the inability to achieve sufficient penetration and distribution of urea reagent injected from the wall into the full exhaust gas flow; the inability to complete the process of urea decomposition to ammonia in the exhaust gas before the SCR catalyst; and, the inability to establish uniform distribution of ammonia at the SCR catalyst face, especially with short residence times or in large cross sectional ducts, or in ducts with complex physical arrangements, such as turns and bends or when operating at very low injection rates such as at low combustor loads.

The prior art discloses the wall injection of aqueous urea and ammonia reagents on large boilers using the selective non-catalytic reduction process (SNCR). In the case of SNCR, the reagent is generally mixed with dilution water and injected as a very dilute solution with high volumes of liquid in the high temperature zone of the furnace at temperatures of 1700° F. to 2100° F. The dilution water ensures penetration of the reagent across the furnace. For example, in U.S. Pat. No. 3,900,554, Lyon discloses the injection of an aqueous solution of ammonia into a furnace at a true temperature of 1300° F. to 2000° F. for the selective non-catalytic reduction of NOx. In U.S. Pat. No. 4,842,834, Burton describes a process for injecting reagents, including urea, into large furnaces at a temperature of 1700° F. to 2500° F. using an atomization conduit positioned on the furnace wall. Peter-Hoblyn et al., in U.S. Pat. No. 5,342,592, describes the use of retractable and water-cooled injectors for the injection of reagent across large furnace dimensions with high flue gas temperatures.

However, these prior art systems are generally not practicable in connection with employing relatively low volumes of concentrated reagent for small boilers or gas fired combustion systems using SCR. The low volume of reagent makes control of injection rate and the distribution of the reagent in the gas stream difficult, especially at low combustor loads.

In the SCR process, the distribution of the reagent across the duct and the mixing of the injected reagent with the exhaust gases containing the NOx is critical to having a uniform distribution of reagent and exhaust gases at the face of the catalyst in order to maximize NOx reduction and to avoid un-reacted reagent from slipping by the catalyst.

CFD modeling can be used to simulate the dimensions of a duct and the gas flow through a duct, and CFD techniques can be used to identify preferred injector locations to minimize the mal-distribution of reagent across the catalyst face as described in co-pending U.S. Patent Application Publication No. US 2014/0099247 A1 to Jangiti et al., also assigned to assignee of the present application. U.S. Patent Application Publication No. US 2014/0099247 A1 is hereby incorporated by reference herein in its entirety.

In U.S. Patent Application Publication No. 2014/0099247, Jangiti et al. describes a method for using computer modeling to identify the optimum location for installing wall mounted injectors on the exhaust duct of a lean NOx combustor to improve the distribution of reagent at the downstream catalyst. While helping to optimize injection location, such that the RMS at the catalyst is generally less than 15%, Jangiti et al. does not specifically explore the mechanical limitations on operating certain types of injectors at low injection flow rates such as required at low boiler loads, nor how to maintain good reagent distribution at a downstream catalyst where the traditional method would be to take certain injectors out of service at low flow conditions.

Pulse width solenoid actuated injectors with known spray characteristics, such as those described in U.S. Pat. No. 5,976,475 to Peter-Hoblyn et al. and U.S. Pat. No. 7,467,749 to Tarabulski et al., represent one method to accurately introduce reagent into the duct. Such injectors can be mounted directly on the exhaust duct wall or can be mounted to an air lance as is disclosed in co-pending U.S. Patent Application Publication No. US 2012/0177553 A1 to Lindemann et al., also assigned to assignee of the present application (hereby incorporated by reference herein in its entirety). In many cases, especially on larger ducts, it is preferred to use multiple injectors around the periphery of the exhaust duct in locations determined in part by CFD modeling. This provides better distribution of the reagent across the duct versus a single point of injection.

An advantage of the pulse width solenoid actuated injector is that the injection rate can be varied instantaneously at a frequency of 5 or 10 Hz (5 or 10 injection events per second) by holding the valve in an open position electronically for some programmable period ("injector on-time"). This can be done by a computer that has the ability to adjust the injector on-time automatically based on a process signal such as boiler load, exhaust gas flow rate, exhaust gas temperature or a NOx signal. Typical injector on-times range from 10% to 85%. Outside of this range the injector can lose accuracy between pulses.

Multiple injectors can also allow for better turndown in the reagent injection rate to respond to lower boiler loads requiring lesser amounts of reagent. One method of turndown is to take certain injectors out of service at lower loads and use only a few remaining injectors. However this causes an imbalance in the location of the reagent injected relative to the bulk exhaust gas flow in the duct and can lead to lower NOx reductions by depriving some of the exhaust gases of reagent for reaction across the catalyst.

In U.S. Pat. No. 8,109,077, Reba et al. describes a method for injecting a fluid, such as aqueous urea, into the exhaust of a diesel engine and describes a dual injector system generally directed at injecting two different reagents. In other cases where the reagent is the same, one injector can be on while the other is off depending on engine operating conditions. While the concept of having one injector on and one injector off is described by Reba et al., there is no mention of sequencing of the injectors in an on/off pattern to achieve good distribution in a duct across a downstream catalyst. In the application of multiple injectors to a diesel engine exhaust as described by Reba et al., the duct diameter is generally small and the velocity is high thereby making the mixing and distribution of reagent across a downstream catalyst less of a concern than in large dimension exhausts ducts with low velocity and generally poor mixing.

Reba et al. speaks to one of the issues addressed by the present invention by describing the variation in flow from a solenoid actuated return flow injector of the preferred type as +/−20% when operated at low flow rates and Reba et al. describes the desire to operate above 10% on time as much as possible. The current invention recognizes the issue with solenoid actuated injectors at low flow and teaches the novel concept of shutting injectors off and on in a sequential pattern at low flow such that the need to operate multiple injectors concurrently at low on times is reduced by sequentially operating only one injector at a time, or in the case of pairs of injectors, only one pair, at a time.

Reba et al. discloses the use of a lead injector and a lag injector and operating injectors at different frequencies and on times to cover a broad range of injection ranges. However there is no disclosure of alternately sequencing the injectors for short bursts of injection at low loads to accommodate very low injection rates while maintaining good distribution of reagent across a downstream catalyst, as does the current invention.

In U.S. Patent Application Publication No. US 2003/0109047 A1, Valentine teaches a plurality of separately controlled injectors incorporating a metering valve and air lance for the introduction of pollution control chemicals into the effluent of a combustor over widely variable combustor loads. The approach of Valentine is directed at SNCR applications where large volumes of reagent are injected into the furnace at high temperatures for a gas phase reaction with NOx local to the point of injection. While Valentine teaches the ability to adjust injection rate, Valentine does not recognize the inherent issue with solenoid actuated injectors related to their loss of accuracy at low injection rates and so does not suggest the concept of sequencing the operation of individual injectors between off and on when operating at low loads.

In fact, in the application of Valentine for SNCR, the use of sequential injection would not be beneficial as the reagent would be injected in high concentrations at the point of injection and would not have the opportunity to mix out across the furnace in the preferred temperature zone for the SNCR NOx reduction reaction. In contrast, the current invention is directed at sequential injection in an SCR process where given sufficient mixing and residence time the concentration of reagent from sequential on/off operation of injectors can still be distributed and mixed with the exhaust gases before reaching the face of the downstream catalyst.

Thus, the problem remains in accordance with known prior art designs, that at low boiler loads the total reagent injection rate can be so low that multiple injectors cannot simultaneously be operated to inject at such a low quantity (and low % on-time). Moreover, in accordance with known prior art designs, taking some injectors out of service to maintain a minimum reagent flow through the remaining injectors creates mal-distribution of reagent and localized high spots of reagent concentration in the duct and at the catalyst face.

SUMMARY OF THE INVENTION

These, and other, problems associated with known prior art designs are obviated by the present invention, in connection with which multiple injectors around the periphery of a duct are electronically sequenced in and out of service and are only out of operation for a short period of time (e.g. 0.5-5 seconds), and preferably less than 2 seconds, before injecting again. Thus, any imbalance in reagent injection into the duct is of very short duration and the reagent concentration in the duct tends to balance out at the downstream catalyst face. Additionally, flow conditioning devices can be installed upstream or downstream of the injection point to assist in mixing the reagent into the exhaust gas and distributing the reagent across the catalyst face.

More specifically, in accordance with one aspect of the present invention, a lean burn combustion source having reduced pollutant emissions includes an exhaust duct having exhaust gases passing therethrough, a plurality of injectors positioned so as to inject reagent into the exhaust gases passing through the exhaust duct and a controller in communication with the plurality of injectors. The controller causes the plurality of injectors to operate in an alternating sequence wherein at least one of the plurality of injectors is caused to inject for a period of time while the remaining ones of the plurality of injectors are caused to be not injecting. The combustion source also includes a catalyst located downstream of the plurality of injectors and spaced apart from the plurality of injectors such that the reagent is allowed to decompose in the exhaust gases and to react across the catalyst to reduce pollutant emissions.

In some embodiments, the reagent comprises urea or ammonia and the reduced pollutant emissions comprise nitrogen oxides (NOx). In some embodiments, the plurality of injectors comprises a first injector, a second injector and a third injector, and the controller: (a) causes the first injector to inject while the second and third injectors are caused to be not injecting; (b) causes the second injector to inject while the first and third injectors are caused to be not injecting; and (c) causes the third injector to inject while the first and second injectors are caused to be not injecting. In these embodiments, steps (a)-(c) are sequentially repeated for so long as a required on time for the operating injector is less than 20%.

In some embodiments, the period of time is between about 0.5 seconds and about 2.0 seconds. In some embodiments, the plurality of injectors comprises two injectors and the controller causes the injectors to operate individually and sequentially at an injection rate of about 0.07 to about 0.10 gallons per hour of reagent. In certain of these embodiments, the injection rate is about 0.5 to about 1.0 gallons per hour of reagent.

In some embodiments, the plurality of injectors comprises an even number of four or more injectors and the injectors are operated and sequenced in groups.

In certain of these embodiments, the plurality of injectors comprises a top left injector, a middle left injector, a bottom left injector, a top right injector, a middle right injector and a bottom right injector and the controller: (a) causes the top left injector and the bottom right injector to inject while the middle left injector, the bottom left injector, the top right injector and the middle right injector are caused to be not injecting; (b) causes the top right injector and the bottom left injector to inject while the middle left injector, the top left injector, the bottom right injector and the middle right injector are caused to be not injecting; and (c) causes the middle left injector and the middle right injector to inject while the top left injector, the bottom left injector, the top right injector and the bottom right injector are caused to be not injecting. In these embodiments, steps (a)-(c) are repeated.

In certain other of these embodiments, the plurality of injectors comprises a top left injector, a middle left injector, a bottom left injector, a top right injector, a middle right injector and a bottom right injector and the controller: (a) causes the top left injector, the middle right injector and the bottom left injector to inject while the top right injector, the middle left injector and the bottom right injector are caused to be not injecting; and (b) causes the top right injector, the middle left injector and the bottom right injector to inject while the top left injector, the middle right injector and the bottom left injector are caused to be not injecting. In these embodiments, steps (a)-(b) are repeated.

In some embodiments, the controller comprises a programmable logic controller (PLC) that triggers operation of the plurality of injectors once a low injection rate limit has been reached and at least one of a low combustor load, fuel flow, gas temperature or emissions rate signal has been received by the PLC controller. In some embodiments, the lean burn combustion source comprises two lean burn combustion sources exhausting into a common duct and the common duct further comprises a second plurality of injectors that substantially continuously inject reagent into the exhaust gases of the combustion sources during operation thereof.

In accordance with another aspect of the invention, a method of reducing pollutant emissions from a lean burn combustion source equipped with a plurality of injectors that inject reagent into exhaust gases of the combustion source includes the steps of: operating the plurality of injectors in an alternating sequence wherein at least one of the plurality of injectors is caused to inject for a period of time while the remaining ones of the plurality of injectors are caused to be not injecting, and allowing the reagent to decompose in the exhaust gases and to react across a downstream catalyst to reduce pollutant emissions.

The invention and its particular features and advantages will become more apparent from the following detailed description considered with reference to the accompanying drawings.

DETAILED DESCRIPTION OF THE INVENTION

Figure 1A:
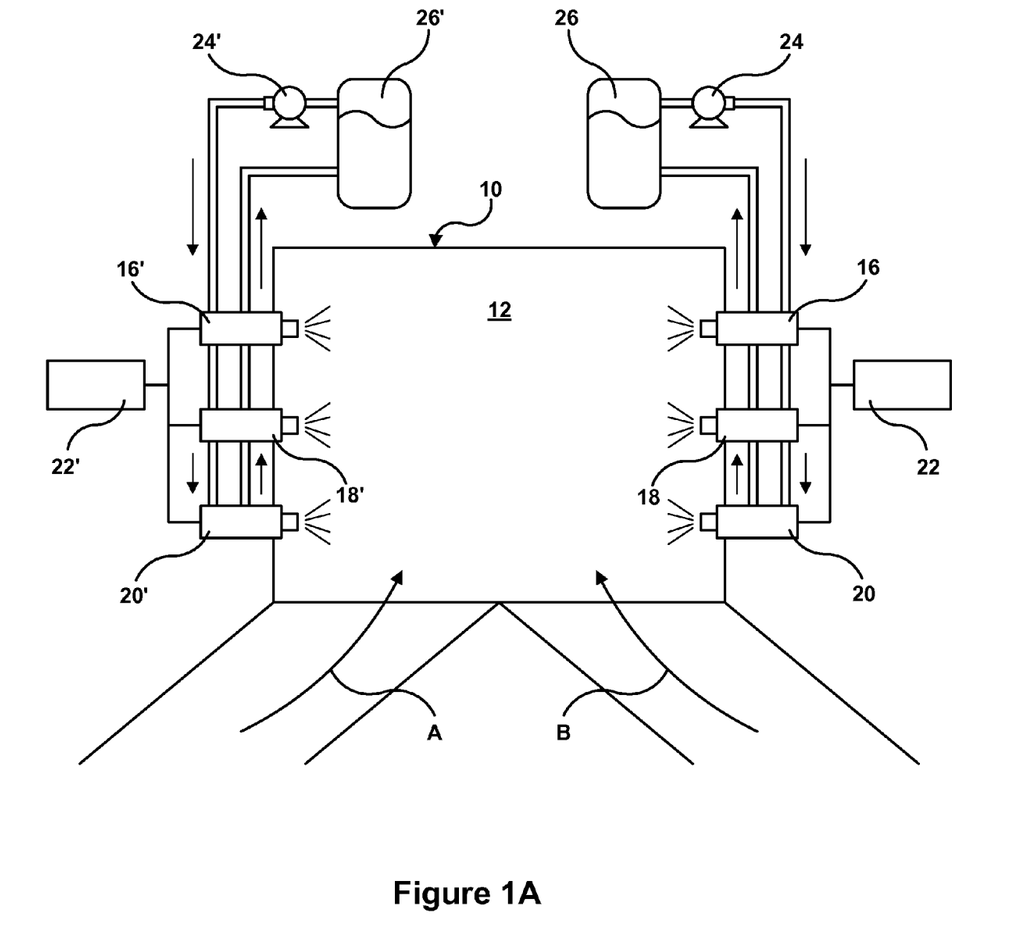
FIG. 1A is a schematic front view of an exemplary embodiment of a system for reducing NOx emissions from a lean burn combustion source configured in accordance with the present invention.
Figure 1B:
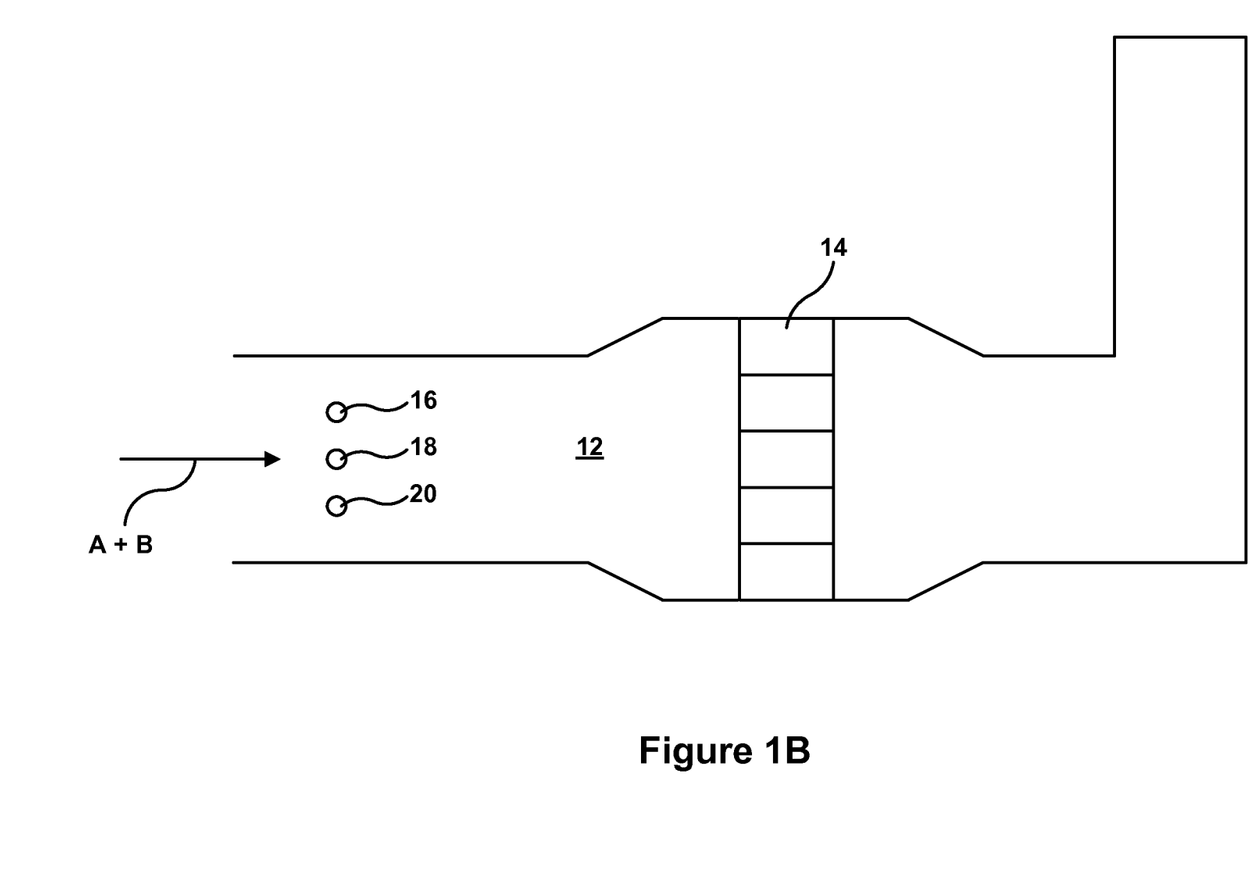
FIG. 1B is a schematic side view of the exemplary embodiment shown in FIG. 1A.

Referring first to FIGS. 1A and 1B, an exemplary embodiment of a system (10) for reducing NOx emissions from a lean burn combustion source configured in accordance with the present invention includes a common duct (12), which is fed with exhaust gases (indicated by arrows A and B) from two identical 55,000 pph natural gas fired boilers (not shown). A common SCR catalyst (14) is placed in the duct (12) at a distance downstream from where the two boiler outlets (shown in the vicinity of arrows A and B in FIG. 1A) combine into the common duct (12).

A water based urea solution is injected into the duct (12) at a rate sufficient to reduce the NOx emissions across the catalyst (14) by a predetermined amount using six solenoid actuated injectors (16, 16', 18, 18', 20, 20') CFD modeling is used to predict where on the exhaust duct (12) the six injectors (16, 16', 18, 18', 20, 20') should be located as described in commonly owned U.S. Patent Application Publication No. US 2014/0099247 A1 to Jangiti et al., (incorporated by reference herein in its entirety).

The injectors (16, 16', 18, 18', 20, 20') are of the solenoid actuated return flow type and are electronically controlled for operation and on time by at least one programmable logic controller (PLC) (22, 22'). Urea solution is circulated by at least one pump (24, 24') from at least one day tank (26, 26') to the injectors (16, 16', 18, 18', 20, 20') and back to the day tank (26, 26'). An injection system of the type marketed by CCA Combustion Systems of Monroe, Conn. under the TRIM-NOX® trade name is ideally suited for controlling the rate of injection using solenoid-actuated injectors (16, 16', 18, 18', 20, 20').

Two groups of three injectors (16, 18, 20) and (16', 18', 20') are controlled by two separate PLCs (22, 22'), one for each boiler. Two separate urea dosing systems including pumps (24, 24'), filters (not shown), tanks (26, 26') and sensors (not shown) are controlled individually by the respective PLCs (22, 22') to circulate urea to and from the injectors (16, 16', 18, 18', 20, 20') under pressure. Each PLC (22, 22') takes in a boiler fuel flow signal as representative of the associated boiler load. The uncontrolled NOx emissions are measured using handheld meters at various boiler loads. Reagent injection rates required to achieve the targeted NOx emission rate are calculated for each boiler load and the corresponding uncontrolled NOx rate. These injection rates are then programmed into the PLC (22, 22') and the injectors (16, 16', 18, 18', 20, 20') are operated electronically to deliver the required injection rate as a function of boiler load.

In the example, when boiler B is operated at full load and boiler A is operated at part load there is an imbalance in gas flow into the common duct (12) and the mass of NOx in the duct (12) is lower on the side of the common duct (12) closest to the low load boiler A. In this case the quantity of reagent required for boiler A is quite low. The group of three injectors (16', 18', 20') associated with this low load boiler A reach a limitation in their low flow turndown capability e.g., they approach the minimum on time operating point where wide flow fluctuations can occur in any operating injector.

Rather than shutting off two injectors and continuously operating just one injector in the group such that reagent distribution in the exhaust gases would consistently be imbalanced, the solution is that the PLC (22') alternately sequences the three low load injectors (16', 18', 20') such that a first injector (16') is operated for a short period (e.g. 2 seconds) in the preferred operating on time range while the other two injectors (18', 20') continue to circulate urea for cooling purposes but do not inject. The PLC (22') then switches off the first injector (16') and turns on a second injector (18') for a short period. The second injector (18') is then switched off and a third injector (20') is turned on. This sequence continues during the low load boiler operation until a boiler load point is reached where the reagent injection rate required is sufficient for the three injectors (16', 18', 20') to again be operated simultaneously within the preferred on time range.

The injectors (16, 18, 20) positioned on the high load boiler side of the duct operate at their normal injection rate but are also programmed for the low load sequenced operation should load on the second boiler reach a low load set point.

In more detail, each boiler requires a total injection quantity of approximately 0.5 gallons per hour (gph) when operating at 100% load, 0.35 gph at 60% load and 0.25 gph at 45% load and 0.20 gph at 30% load. Lower loads require even lower injection rates, though the PLCs (22, 22') are programmed to stop injection when the catalyst temperature falls below a low temperature alarm point.

The minimum injection rate for each injector is 0.09 gph. The PLC for each injection system is programmed such that at 100% boiler load each of the corresponding groups of three injectors operate simultaneously and at approximately the same injection of 0.17 gph to deliver a total of 0.5 gph of reagent. The PLC automatically reduces the reagent rate to each injector as boiler load decreases until the boiler load reaches 45% where the total injection rate is approximately 0.25 gph. At that point, the individual injection rate for each of three associated injectors is below the minimum injection rate of 0.09 gph, The PLC then begins sequencing the injectors such that one injector operates at 0.25 gph for approximately 2 seconds while the other two injectors circulate but do not inject. The one operating injector is programmed to continue to meet even lower load conditions down to a load of 30% where the corresponding total injection rate is 0.20 gph.

The system can be programmed to continue to inject at even lower loads down to the minimum injection rate of 0.09 gph however the exhaust gas temperature falls below the minimum temperature to inject at loads below 30% so injection is stopped at that load point in this particular application. Hence the low load turndown capability of the system is enhanced through the novel method of the current invention. The sequence of one injector on and two injectors off repeats continuously for each of the three injectors until the boiler load again reaches the point, in this case 45% load, where the total injection rate required is greater than 0.25 gph, at which point the PLC signals all three injectors to again simultaneously inject at their minimum injection rate of 0.09 gph.

The injectors of the current invention are typically operated by the PLCs between 5 and 10 Hz (5 to 10 valve cycles per second). Operation at 5 Hz is generally preferred to reduce the number of times the valve impacts the valve seat during its operating lifetime thereby extending injector durability and performance.

Operating time of less than 0.5 seconds therefore results in only two complete valve cycles per injection event, which can result in inaccuracy in the injection quantity and difficulty in measuring the injected quantity with standard flow meters during such a short period of injection.

The preferred upper operating time of 2 seconds per injection event during sequencing provides an adequate number of injection cycles (i.e., 10) to balance out injection inaccuracies from cycle to cycle and also provides a reasonable number of injection cycles to more accurately measure the injected quantity. More that 2-2.5 seconds operation of any one injector during low load sequencing of injectors can lead to a localized high concentration of reagent that may not be fully mixed in the gas flow before the catalyst due to the low gas flow rate and low velocity during low load combustor operation. Imbalances in the reagent to NOx concentration at the catalyst can result in high NOx emissions through the portion of the catalyst that does not have adequate reagent as well as high ammonia slip out of other regions of the catalyst where there is excess reagent. By sequencing the operation of injectors for 2 seconds or less there tends to be adequate mixing and delivery of reagent to the catalyst to meet performance objectives for NOx reduction and ammonia slip.

Figure 2:
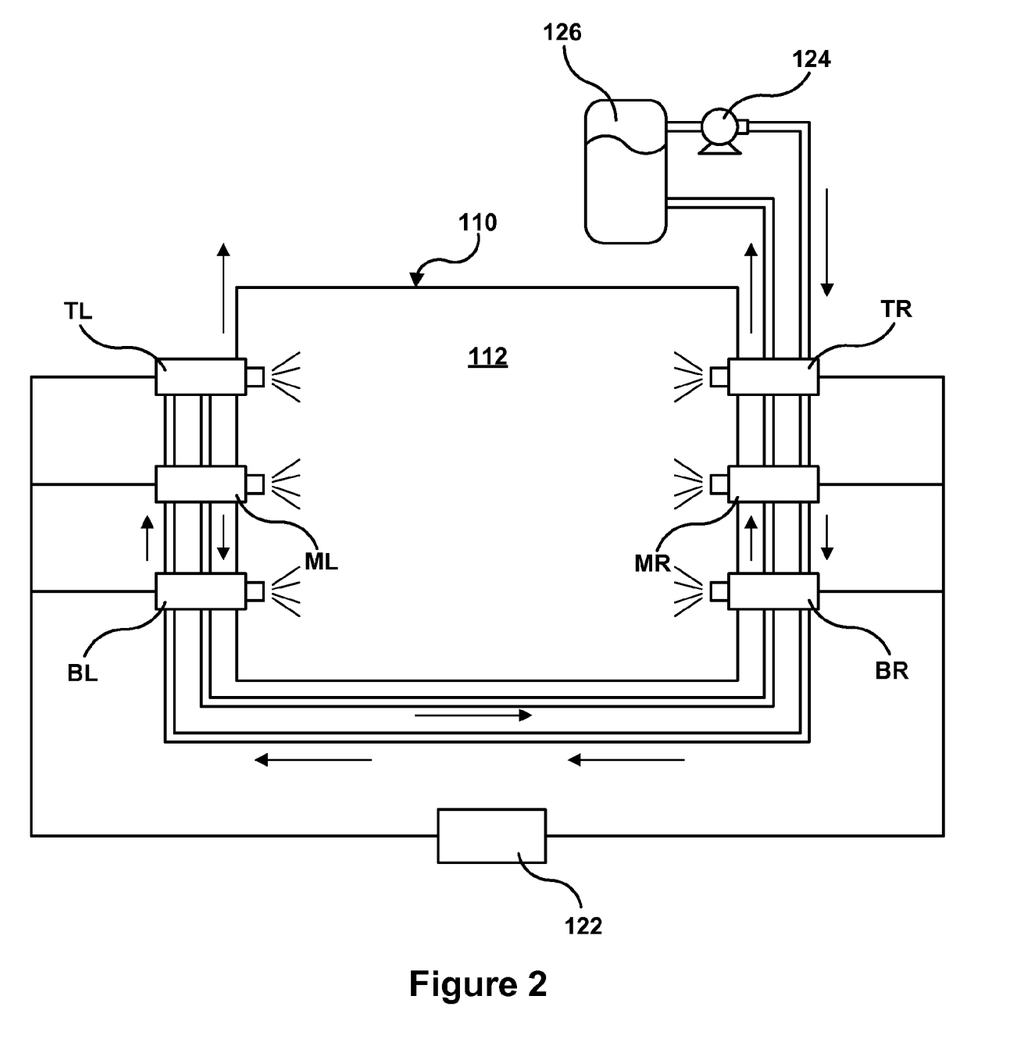
FIG. 2 is a schematic front view of a second exemplary embodiment of a system for reducing NOx emissions from a lean burn combustion source configured in accordance with the present invention.

Referring now to FIG. 2, a second exemplary embodiment of a system (110) for reducing NOx emissions from a lean burn combustion source configured in accordance with the present invention is shown, in connection with which the combustion source is a waste fired boiler with a flue gas flow rate of 57,000 acfm at 600° F. and an uncontrolled NOx of 60 ppm.

The outlet from the boiler to the SCR comprises a horizontal exhaust duct (112) measuring approximately 6' H×5' W. Six solenoid-actuated injectors (TL, ML, BL, TR, MR, BR) are located, three per side, at the top, middle and bottom portions of the exhaust duct at a location upstream of a catalyst (not shown, but arranged similar to that of FIG. 1B). CFD modeling techniques are used to determine the exhaust gas flow streams and temperature and the preferred location for the injectors (TL, ML, BL, TR, MR, BR) such that there is good distribution of the reagent in the duct (112) and adequate residence time is available for evaporation, decomposition and mixing of the injected reagent before the catalyst.

At full load on the boiler, all of the injectors (TL, ML, BL, TR, MR, BR) are operated to provide a total urea injection rate of 1.9 gallons/hr of 32% urea solution in order to reduce the NOx to 9 ppm following the catalyst. At low boiler loads, of less than 50%, and generally less than 30% load, the required injection rate is substantially less and is below the rate of stable operation for it to be injected using all six injectors (TL, ML, BL, TR, MR, BR) simultaneously.

In this case, as shown in FIG. 2, the injectors are operated by a PLC (122) in pairs, with the top left (TL) and bottom right (BR) injector operated alone for a short time while the other injectors circulate, via pump (124) to a day tank (126) but do not inject. Then the top right (TR) and bottom left (BL) injector are operated alone for a short time and finally the two middle (ML,MR) injectors are operated for a short time. This sequence is continued while the boiler is in a low load operating status.

At higher loads and higher injection rates, all of the injectors (TL, ML, BL, TR, MR, BR) are automatically returned to normal operating service by the PLC. In other cases, the injectors (TL, ML, BL, TR, MR, BR) may be sequenced in a pattern of three injectors on and three injectors off; for example, the middle left (ML), top right (TR) and bottom right (BR) injectors may be operated for 0.5-2 seconds and then the middle right (MR), top left (TL) and bottom left (BL) injectors may be operated concurrently for a similar period. Alternatively, at boiler loads requiring very low reagent flows, one injector or one pair of injectors can be operated at a time while the other injectors circulate reagent to a day tank (126) but do not inject.

In another example (not illustrated), the exhaust gas from a natural gas-fired package boiler is exhausted through a 36" diameter exhaust duct with a flue gas flow rate of 27,000 lbs/hr at full boiler load. Uncontrolled NOx in the exhaust gas is 30 ppm. Approximately 0.21-0.24 gallons/hr of a 40% aqueous solution of urea is injected into the exhaust duct upstream of a NOx reduction catalyst to reduce the uncontrolled NOx to less than 5 ppm following the NOx reduction catalyst. Three pulse width solenoid actuated return flow injectors are mounted around the periphery of the duct; in other cases, only two injectors are used. The lowest injection rate for each injector is 0.07-0.08 gallon/hr of urea solution corresponding to a minimum reliable "on time" for this particular design of a pulse width modulated injector.

At full load on the boiler all three of the injectors are operated at their minimum "on time" to inject a total of 0.21-0.24 gallons/hr; or alternatively, two of the injectors are operated at a higher "on time" to provide the required reagent injection rate and the third injector is installed as a spare and operated only in a return flow mode for cooling but without injecting.

At lower boiler loads with a corresponding lower mass rate of NOx emissions the total required injection rate falls to less than 0.1 gallon/hr and even as low as 0.07 gallons/hr. In that case the three injectors are operated sequentially by a PLC such that, first, one injector injects reagent at a rate of 0.07-0.1 gph for a period of 0.5-2.5 seconds while the other two injectors continue to circulate reagent but do not inject. The PLC then stops the first injector from injecting and signals the second injector to inject while the first and third injector are operated only in a circulating mode. This sequence continues, next with the third injector operated in an injection mode and the other two operated only in a circulation mode; and then the sequence starts over again.

By sequencing injection at low loads, good distribution and mixing of reagent through the duct and at the catalyst face is achieved. At higher boiler loads all three injectors can be operated simultaneously or the sequencing of injectors can be continued at the higher injection rate corresponding to the higher NOx mass flow.

Although the invention has been described with reference to a particular arrangement of parts, features and the like, these are not intended to exhaust all possible arrangements or features, and indeed many modifications and variations will be ascertainable to those of skill in the art.

What is claimed is:

1. A lean burn combustion source having reduced pollutant emissions, said lean burn combustion source comprising:
    an exhaust duct having exhaust gases passing therethrough;
    a plurality of injectors positioned so as to inject reagent into the exhaust gases passing through the exhaust duct;
    a controller in communication with said plurality of injectors, said controller causing said plurality of injectors to operate in an alternating sequence together as a group, wherein at least one of the plurality of injectors is caused to inject for a period of time while the remaining ones of the plurality of injectors are caused to be not injecting, and
    a catalyst located downstream of said plurality of injectors and spaced apart from said plurality of injectors such that the reagent is allowed to decompose in the exhaust gases and to react across the catalyst to reduce pollutant emissions.

2. The combustion source of claim 1 wherein the reagent comprises urea or ammonia and the reduced pollutant emissions comprise nitrogen oxides.

3. The combustion source of claim 1 where the period of time is between about 0.5 seconds and about 2.0 seconds.

4. The combustion source of claim 1 where the plurality of injectors comprises two injectors and wherein said controller causes the injectors to operate individually and sequentially at an injection rate of about 0.07 to about 0.10 gallons per hour of reagent.

5. The combustion source of claim 4 where the injection rate is about 0.5 to about 1.0 gallons per hour of reagent.

6. The combustion source of claim 1 wherein said controller comprises a programmable logic controller (PLC) that triggers operation of the plurality of injectors once a low injection rate limit has been reached and at least one of a low combustor load, fuel flow, gas temperature or emissions rate signal has been received by the PLC controller.

7. A lean burn combustion source having reduced pollutant emissions, said lean burn combustion source comprising:
    an exhaust duct having exhaust gases passing therethrough;
    a plurality of injectors positioned so as to inject reagent into the exhaust gases passing through the exhaust duct;
    a controller in communication with said plurality of injectors, said controller causing said plurality of injectors to operate in an alternating sequence wherein at least one of the plurality of injectors is caused to inject for a period of time while the remaining ones of the plurality of injectors are caused to be not injecting, and
    a catalyst located downstream of said plurality of injectors and spaced apart from said plurality of injectors such that the reagent is allowed to decompose in the exhaust gases and to react across the catalyst to reduce pollutant emissions,
    wherein the plurality of injectors comprises a first injector, a second injector and a third injector, and wherein said controller:
    (a) causes the first injector to inject while the second and third injectors are caused to be not injecting;
    (b) causes the second injector to inject while the first and third injectors are caused to be not injecting; and
    (c) causes the third injector to inject while the first and second injectors are caused to be not injecting; and
    wherein steps (a)-(c) are sequentially repeated.

8. The combustion source of claim 7 wherein steps (a)-(c) are sequentially repeated for so long as a required predetermined injector on-time is less than 20% of injection out of a total injection operating time.

9. A lean burn combustion source having reduced pollutant emissions, said lean burn combustion source comprising:
    an exhaust duct having exhaust gases passing therethrough;
    a plurality of injectors positioned so as to inject reagent into the exhaust gases passing through the exhaust duct;
    a controller in communication with said plurality of injectors, said controller causing said plurality of injectors to operate in an alternating sequence wherein at least one of the plurality of injectors is caused to inject for a period of time while the remaining ones of the plurality of injectors are caused to be not injecting, and a catalyst located downstream of said plurality of injectors and spaced apart from said plurality of injectors such that the reagent is allowed to decompose in the exhaust gases and to react across the catalyst to reduce pollutant emissions, wherein the plurality of injectors comprises an even number of four or more injectors and the injectors are operated and sequenced in groups.

10. The combustion source of claim 9 wherein the plurality of injectors comprises a top left injector, a middle left injector, a bottom left injector, a top right injector, a middle right injector and a bottom right injector and wherein said controller:
(a) causes the top left injector and the bottom right injector to inject while the middle left injector, the bottom left injector, the top right injector and the middle right injector are caused to be not injecting;
(b) causes the top right injector and the bottom left injector to inject while the middle left injector, the top left injector, the bottom right injector and the middle right injector are caused to be not injecting; and
(c) causes the middle left injector and the middle right injector to inject while the top left injector, the bottom left injector, the top right injector and the bottom right injector are caused to be not injecting; and wherein steps (a)-(c) are repeated.

11. The combustion source of claim 9 wherein the plurality of injectors comprises a top left injector, a middle left injector, a bottom left injector, a top right injector, a middle right injector and a bottom right injector and wherein said controller:
(a) causes the top left injector, the middle right injector and the bottom left injector to inject while the top right injector, the middle left injector and the bottom right injector are caused to be not injecting; and
(b) causes the top right injector, the middle left injector and the bottom right injector to inject while the top left injector, the middle right injector and the bottom left injector are caused to be not injecting; and wherein steps (a)-(b) are repeated.

12. A lean burn combustion source having reduced pollutant emissions, said lean burn combustion source comprising:
an exhaust duct having exhaust gases passing therethrough;
a plurality of injectors positioned so as to inject reagent into the exhaust gases passing through the exhaust duct;
a controller in communication with said plurality of injectors, said controller causing said plurality of injectors to operate in an alternating sequence wherein at least one of the plurality of injectors is caused to inject for a period of time while the remaining ones of the plurality of injectors are caused to be not injecting, and
a catalyst located downstream of said plurality of injectors and spaced apart from said plurality of injectors such that the reagent is allowed to decompose in the exhaust gases and to react across the catalyst to reduce pollutant emissions,
wherein the lean burn combustion source comprises two lean burn combustion sources exhausting into a common duct and the common duct further comprises a second plurality of injectors that substantially continuously inject reagent into the exhaust gases of the combustion sources during operation thereof.

13. A method of reducing pollutant emissions from a lean burn combustion source equipped with a plurality of injectors that inject reagent into exhaust gases of the combustion source, said method comprising the steps of:
operating the plurality of injectors in an alternating sequence wherein at least one of the plurality of injectors is caused to inject for a period of time while the remaining ones of the plurality of injectors are caused to be not injecting, and
allowing the reagent to decompose in the exhaust gases and to react across a downstream catalyst to reduce pollutant emissions,
wherein the plurality of injectors comprises a first injector, a second injector and a third injector, and wherein said operating step comprises the steps of:
(a) causing the first injector to inject while the second and third injectors are caused to be not injecting;
(b) causing the second injector to inject while the first and third injectors are caused to be not injecting; and
(c) causing the third injector to inject while the first and second injectors are caused to be not injecting; and wherein steps (a)-(c) are sequentially repeated.

14. The method of claim 13 wherein the reagent comprises urea or ammonia and the reduced pollutant emissions comprise nitrogen oxides (NOX).

15. The method of claim 13 wherein steps (a)-(c) are sequentially repeated for so long as a required predetermined injector on-time is less than 20% of injection out of a total injection operating time.

16. The method of claim 13 where the period of time is between about 0.5 seconds and about 2.0 seconds.

17. The method of claim 13 where the plurality of injectors comprises two injectors and wherein the injectors are operated individually and sequentially at an injection rate of about 0.07 to about 0.10 gallons per hour of reagent.

18. The method of claim 17 where the injection rate is about 0.5 to about 1.0 gallons per hour of reagent.

19. The method of claim 13 further comprising the step of employing computer modeling techniques to locate positions of the injectors within the exhaust gases and to identify a preferred sequence and duration of injection of the plurality of injectors.

20. The method of claim 13 wherein the sequence is programmed into a programmable logic controller (PLC) that triggers operation of the plurality of injectors once a low injection rate limit has been reached and at least one of a low combustor load, fuel flow, gas temperature or emissions rate signal has been received by the PLC controller.

21. A method of reducing pollutant emissions from a lean burn combustion source equipped with a plurality of injectors that inject reagent into exhaust gases of the combustion source, said method comprising the steps of:
operating the plurality of injectors in an alternating sequence wherein at least one of the plurality of injectors is caused to inject for a period of time while the remaining ones of the plurality of injectors are caused to be not injecting, and
allowing the reagent to decompose in the exhaust gases and to react across a downstream catalyst to reduce pollutant emissions,
wherein the plurality of injectors comprises an even number of four or more injectors and the injectors are operated and sequenced in groups, and
wherein the plurality of injectors comprises an even number of four or more injectors and the injectors are operated and sequenced in groups.

22. The method of claim 21 wherein the plurality of injectors comprises a top left injector, a middle left injector, a bottom left injector, a top right injector, a middle right injector and a bottom right injector and wherein said operating step comprises:

(a) causing the top left injector and the bottom right injector to inject while the middle left injector, the bottom left injector, the top right injector and the middle right injector are caused to be not injecting;

(b) causing the top right injector and the bottom left injector to inject while the middle left injector, the top left injector, the bottom right injector and the middle right injector are caused to be not injecting; and (c) causing the middle left injector and the middle right injector to inject while the top left injector, the bottom left injector, the top right injector and the bottom right injector are caused to be not injecting; and wherein steps (a)-(c) are repeated.

23. The method of claim 21 wherein the plurality of injectors comprises a top left injector, a middle left injector, a bottom left injector, a top right injector, a middle right injector and a bottom right injector and wherein said operating step comprises the steps of:

(a) causing the top left injector, the middle right injector and the bottom left injector to inject while the top right injector, the middle left injector and the bottom right injector are caused to be not injecting;

(b) causing the top right injector, the middle left injector and the bottom right injector to inject while the top left injector, the middle right injector and the bottom left injector are caused to be not injecting; and wherein steps (a)-(b) are repeated.

24. A method of reducing pollutant emissions from a lean burn combustion source equipped with a plurality of injectors that inject reagent into exhaust gases of the combustion source, said method comprising the steps of:

operating the plurality of injectors in an alternating sequence wherein at least one of the plurality of injectors is caused to inject for a period of time while the remaining ones of the plurality of injectors are caused to be not injecting, and allowing the reagent to decompose in the exhaust gases and to react across a downstream catalyst to reduce pollutant emissions, wherein the plurality of injectors comprises an even number of four or more injectors and the injectors are operated and sequenced in groups, and wherein the lean burn combustion source comprises two lean burn combustion sources exhausting into a common duct and the common duct is further equipped with a second plurality of injectors that substantially continuously inject reagent into the exhaust gases of the combustion sources during operation thereof.

* * * * *